(12) United States Patent
Nistico

(10) Patent No.: US 11,831,981 B2
(45) Date of Patent: Nov. 28, 2023

(54) SENSOR SYSTEM ARCHITECTURE WITH FEEDBACK LOOP AND MULTIPLE POWER STATES

(71) Applicant: Walter Nistico, Redwood City, CA (US)

(72) Inventor: Walter Nistico, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 17/400,502

(22) Filed: Aug. 12, 2021

(65) Prior Publication Data

US 2021/0377453 A1 Dec. 2, 2021

Related U.S. Application Data

(63) Continuation of application No. PCT/US2020/023750, filed on Mar. 20, 2020.
(Continued)

(51) Int. Cl.
*H04N 23/65* (2023.01)
*G06T 7/10* (2017.01)
(Continued)

(52) U.S. Cl.
CPC ............ *H04N 23/651* (2023.01); *G06T 1/20* (2013.01); *G06T 7/10* (2017.01); *H04N 23/667* (2023.01)

(58) Field of Classification Search
CPC . G06T 7/246; G06T 7/10; G06T 2207/30041; G06T 1/20; H04N 13/271;
(Continued)

(56) References Cited

U.S. PATENT DOCUMENTS 9,503,641 B2 11/2016 Likamwa et al.
9,509,910 B2 * 11/2016 Skogo .................. H04N 23/651
(Continued)

FOREIGN PATENT DOCUMENTS

EP 2804074 A2 11/2014
KR 10-2011-0025673 A 3/2011
(Continued)

OTHER PUBLICATIONS

U.S. Patent and Trademark Office, Non-Final Office Action, U.S. Appl. No. 17/401,385, 23 pages, dated Mar. 13, 2023.
(Continued)

*Primary Examiner* — Pritham D Prabhakher
(74) *Attorney, Agent, or Firm* — Thompson Hine LLP

(57) ABSTRACT

In one implementation, a system includes an event sensor with a pixel array and an image pipeline. The pixel array is configured to operate a first subset of pixels in an active state and a second subset of pixels in an inactive state. The event sensor is configured to output pixel events. Each respective pixel event is generated in response to a specific pixel within the first subset of pixels detecting a change in light intensity that exceeds a comparator threshold. The image pipeline is configured to consume image data derived from the pixel events and communicate feedback information to the event sensor based on the image data. The feedback information causes a pixel within the first subset of pixels to transition from the active state to another state.

20 Claims, 7 Drawing Sheets

Related U.S. Application Data

(60) Provisional application No. 62/824,493, filed on Mar. 27, 2019.

(51) Int. Cl.
  *G06T 1/20* (2006.01)
  *H04N 23/667* (2023.01)

(58) Field of Classification Search
  CPC .. H04N 13/296; H04N 13/293; H04N 13/279; H04N 23/651; H04N 23/667; H04N 25/47; H04N 25/42
  USPC ........................................................ 348/222.1
  See application file for complete search history.

(56) References Cited

U.S. PATENT DOCUMENTS

| | | | |
|---|---|---|---|
| 9,521,349 | B2 | 12/2016 | Vogelsang et al. |
| 9,762,829 | B2* | 9/2017 | Choi .................... H04N 25/709 |
| 10,295,669 | B2* | 5/2019 | Deane .................... G01S 7/4817 |
| 10,395,376 | B2* | 8/2019 | Fu .............................. G06T 7/20 |
| 10,516,838 | B2* | 12/2019 | Suh ......................... H04N 25/63 |
| 10,531,031 | B2* | 1/2020 | Park ...................... H04N 25/772 |
| 10,645,323 | B2* | 5/2020 | Takahashi ............... H04N 25/75 |
| 10,845,601 | B1* | 11/2020 | Meier .................... G06F 3/0325 |
| 10,863,098 | B2* | 12/2020 | Priyantha ............... H04N 23/45 |
| 11,509,840 | B2* | 11/2022 | Wakabayashi ......... H04N 25/40 |
| 2002/0044211 | A1 | 4/2002 | Tujii |
| 2014/0192206 | A1 | 7/2014 | Holz |
| 2014/0232932 | A1* | 8/2014 | LiKamWa ............ H04N 23/651 348/372 |
| 2014/0313387 | A1* | 10/2014 | Vogelsang ........... H04N 25/702 348/308 |
| 2014/0320688 | A1 | 10/2014 | Skogo et al. |
| 2014/0375820 | A1* | 12/2014 | Priyantha ............... H04N 7/188 348/169 |
| 2015/0070544 | A1* | 3/2015 | Smith .................... H04N 25/59 348/297 |
| 2015/0373290 | A1* | 12/2015 | Vogelsang ........... H04N 25/709 348/302 |
| 2016/0037110 | A1 | 2/2016 | Choi et al. |
| 2018/0077374 | A1 | 3/2018 | Takahashi |
| 2018/0143701 | A1 | 5/2018 | Suh et al. |
| 2018/0167570 | A1 | 6/2018 | Suh et al. |
| 2018/0231660 | A1 | 8/2018 | Deane |
| 2018/0262705 | A1 | 9/2018 | Park et al. |
| 2019/0026901 | A1 | 1/2019 | Fu et al. |
| 2021/0152757 | A1* | 5/2021 | Wakabayashi ......... G06V 10/22 |

FOREIGN PATENT DOCUMENTS

| | | |
|---|---|---|
| KR | 10-2012-0061034 A | 6/2012 |
| KR | 10-2017-0027107 A | 3/2017 |
| KR | 10-2018-0068720 A | 6/2018 |
| WO | 2020/197956 A1 | 10/2020 |
| WO | 2020/197972 A1 | 10/2020 |

OTHER PUBLICATIONS

European Patent Office, Communication Pursuant to Article 94(3) EPC, European Patent Application No. 20719019.0, 5 pages, dated Mar. 31, 2023.

U.S. Patent and Trademark Office, Final Office Action, U.S. Appl. No. 17/401,385, 17 pages, dated Oct. 11, 2022.

U.S. Patent and Trademark Office Notice of Allowance dated Aug. 28, 2023 which pertains to U.S. Appl. No. 17/401,385, filed August 13, 2021. 11 pages.

European Patent Office (ISA/EP), International Search Report and Written Opinion of the International Searching Authority, International Application No. PCT/US2020/023750, 11 pages, dated May 18, 2020.

European Patent Office (ISA/EP), International Search Report and Written Opinion of the International Searching Authority, International Application No. PCT/US2020/023777, 15 pages, dated Aug. 31, 2020.

Belenky, A. et al., "A Snapshot CMOS Image Sensor with Extended Dynamic Range," IEEE Sensors Journal, vol. 9, No. 2, pp. 103-111, Feb. 2009.

Moyes, D.P. et al., "A Sensitive Dynamic and Active Pixel Vision Sensor for Color or Neural Imaging Applications," IEEE Transactions on Biomedical Circuits and Systems, 14 pages, Nov. 2017.

Choi, J. et al., "A Spatial-Temporal Multiresolution CMOS Image Sensor with Adaptive Frame Rates for Tracking the Moving Objects in Region-of-Interest and Suppressing Motion Blur," IEEE Journal of Solid-State Circuits, vol. 42, No. 12, pp. 2978-2989, Dec. 2007.

U.S. Patent and Trademark Office, Non-Final Office Action, U.S. Appl. No. 17/401,385, 14 pages, dated Apr. 13, 2022.

Korean Intellectual Property Office, Notice of Preliminary Rejection (with English translation), Korean Patent Application No. 10-2021-7030658, 10 pages, dated Oct. 18, 2022.

Korean Intellectual Property Office, Notice of Allowance dated Sep. 13, 2023 which pertains to Korean Patent Application 10-2021-70306658. 5 pages.

* cited by examiner

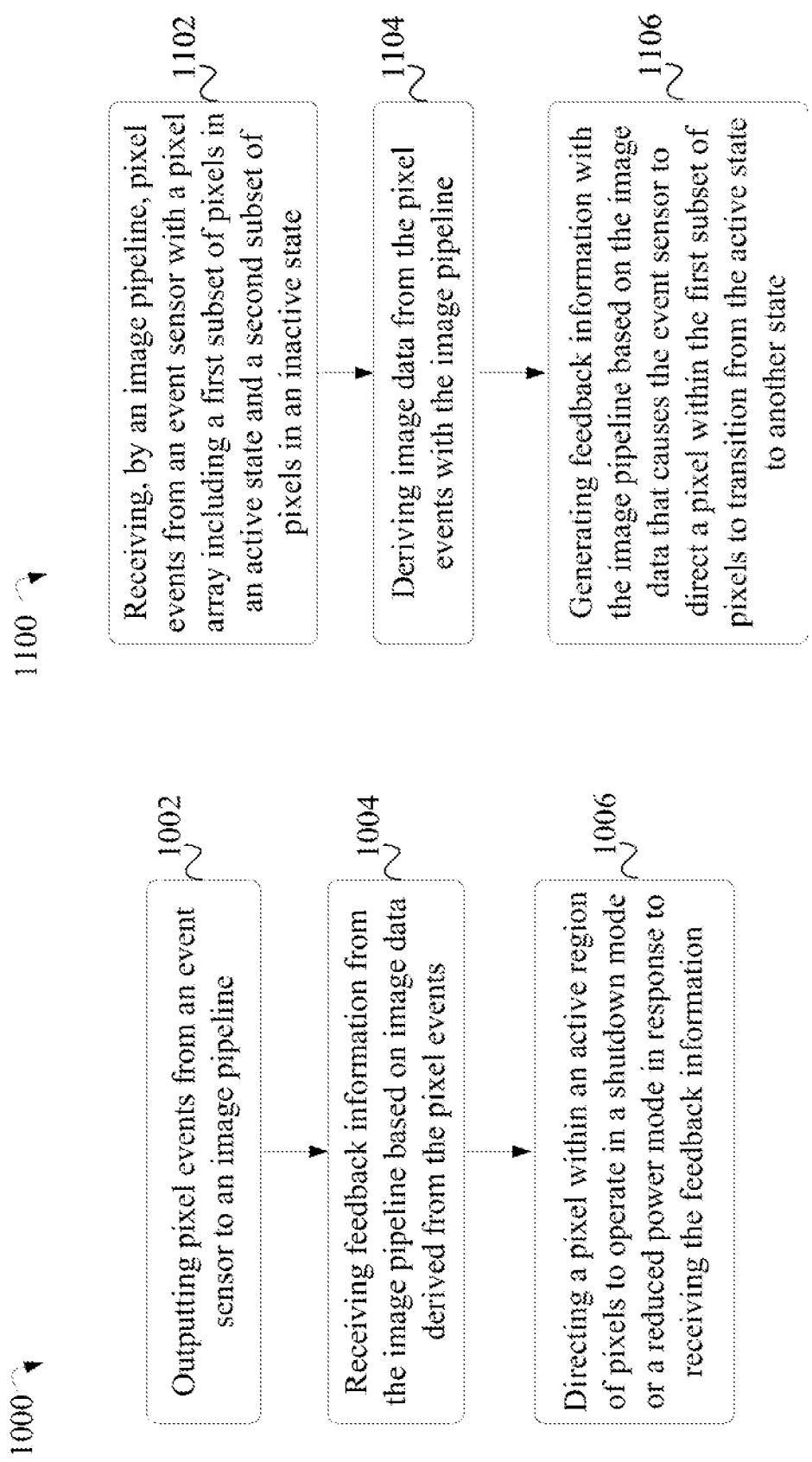

SENSOR SYSTEM ARCHITECTURE WITH FEEDBACK LOOP AND MULTIPLE POWER STATES

CROSS REFERENCE TO RELATED APPLICATIONS

This application is related to International Application No. PCT/US2020/023777, filed Mar. 20, 2020, which is entitled "HARDWARE IMPLEMENTATION OF SENSOR ARCHITECTURE WITH MULTIPLE POWER STATES", and incorporated herein by reference as if reproduced in its entirety.

TECHNICAL FIELD

The present disclosure generally relates to the field of image processing, and in particular, to techniques for implementing a sensor system architecture with a feedback loop and a sensor configured to support multiple power states.

BACKGROUND

An event camera may include an image sensor that is referred to as a dynamic vision sensor ("DVS"), a silicon retina, an event-based sensor, or a frame-less sensor. Thus, the event camera generates (and transmits) data regarding changes in light intensity at each pixel sensor as opposed to data output by frame-based cameras regarding absolute light intensity at each pixel. Stated differently, while a frame-based camera will continue to generate (and transmit) data regarding absolute light intensity at each pixel when an illumination level of a scene disposed within its field of view remains static, an event camera will refrain from generating or transmitting data until a change in the illumination level is detected.

Some image processing operations utilize less than a full set of image data derived from pixel events output by an event driven sensor. Such image processing operations may improve computational efficiency by cropping the image data and process the cropped image data to conserve power and the like. However, pixels of an event driven sensor corresponding to the image data external to the cropped image data continue to operate, and thus continue to consume power. As such, it is desirable to address this inefficiency arising when image processing operations utilize less than a full set of image data derived from pixel events output by an event driven sensor.

SUMMARY

Various implementations disclosed herein relate to techniques for implementing an event camera system architecture with a feedback loop and an event driven sensor configured to support multiple power states. In one implementation, a system includes an event sensor with a pixel array and an image pipeline. The pixel array is configured to operate a first subset of pixels in an active state and a second subset of pixels in an inactive state. The event sensor is configured to output pixel events. Each respective pixel event is generated in response to a specific pixel within the first subset of pixels detecting a change in light intensity that exceeds a comparator threshold. The image pipeline is configured to consume image data derived from the pixel events and communicate feedback information to the event sensor based on the image data. The feedback information causes a pixel within the first subset of pixels to transition from the active state to another state.

In another implementation, a system includes an event sensor, a processor, and a computer-readable storage medium. The event sensor includes a pixel array configured to have an active region of pixels operating in a full power mode and an inactive region of pixels operating in a shutdown power mode or a reduced power mode. The computer-readable storage medium comprising instructions that upon execution by the processor cause the system to perform operations. The operations include outputting pixel events from the event sensor to an image pipeline. Each respective pixel event is generated in response to a specific pixel within the active region of pixels detecting a change in light intensity that exceeds a comparator threshold. The operations further include receiving feedback information from the image pipeline based on image data derived from the pixel events. A pixel within the active region of pixels is directed to operate in the shutdown power mode or the reduced power mode in response to receiving the feedback information.

In another implementation, a system includes a processor, an image pipeline, and a computer-readable storage medium comprising instructions that upon execution by the processor cause the system to perform operations. The operations include receiving, by the image pipeline, pixel events from an event sensor with a pixel array including a first subset of pixels in an active state and a second subset of pixels in an inactive state. Each respective pixel event is generated in response to a specific pixel within the first subset of pixels detecting a change in light intensity that exceeds a comparator threshold. The operations further include deriving image data from the pixel events with the image pipeline. The image pipeline generates feedback information based on the image data. The feedback information causes the event sensor to direct a pixel within the first subset of pixels to transition from the active state to another state.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 10 is a flow-chart illustrating an example of a method of implementing an event camera system architecture with a feedback loop and an event driven sensor configured to support multiple power states.

FIG. 11 is a flow-chart illustrating another example of a method of implementing an event camera system architecture with a feedback loop and an event driven sensor configured to support multiple power states.

Figure 1:
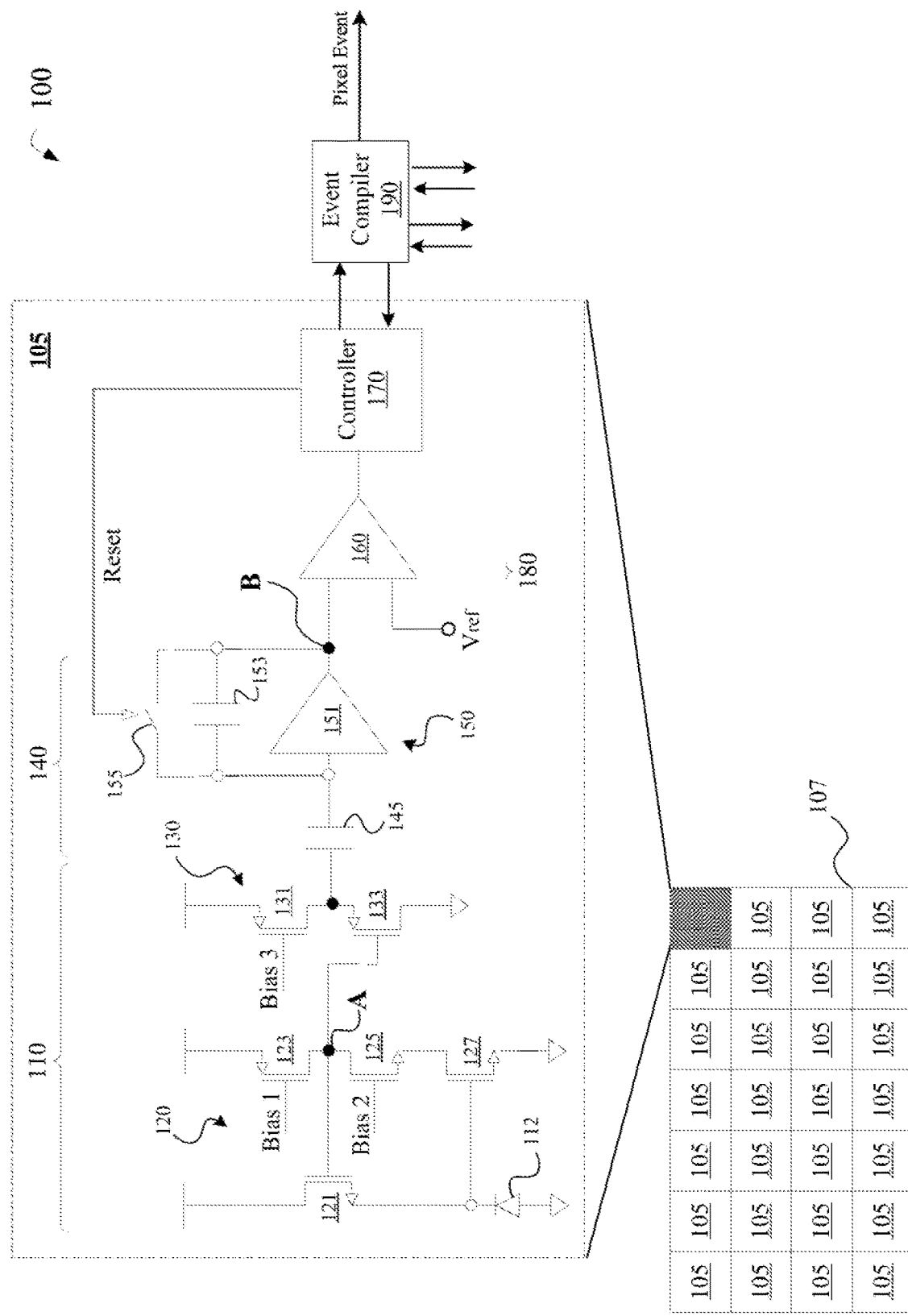
FIG. 1 illustrates a functional block diagram of an event sensor, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

A functional block diagram of an example event sensor 100 is illustrated by FIG. 1. Event sensor 100 includes a plurality of pixels 105 positioned to receive light from a scene disposed within a field of view of event sensor 100. In FIG. 1, the plurality of pixels 105 are arranged in a matrix 107 of rows and columns and, thus, each of the plurality of pixels 105 is associated with a row value and a column value. Each of the plurality of pixels 105 include a photodetector circuit 110 and an event circuit 180.

Photodetector circuit 110 is configured to generate signals indicative of an intensity of light incident on a respective pixel 105 ("incident illumination"). To that end, photodetector circuit 110 includes a photodiode 112 configured to generate a photocurrent that is proportional to an intensity of incident illumination. The photocurrent generated by photodiode 112 flows into a logarithmic amplifier 120 formed by transistors 121, 123, 125, and 127. Logarithmic amplifier 120 is configured to convert the photocurrent into a voltage at node A with a value that is a logarithm of a value of the photocurrent. The voltage at node A is then amplified by a buffer amplifier 130 formed by transistors 131 and 133 before being applied to an input side of a differential circuit 140 of event circuit 180.

Pixel 105 further includes an event circuit 180 comprising a differencing circuit 140, a comparator 160, and a controller 170. Differencing circuit 140 is composed of alternating current ("AC") coupling capacitor 145 and switched capacitor amplifier 150. Differencing circuit 140 is configured to remove a direct current ("DC") voltage component from the voltage at node A to produce pixel data at sampling node B. By removing the DC voltage component from the voltage at node A, the pixel data at sampling node B data provides a differential value of the intensity of incident illumination detected by photodiode 112. A gain provided by amplifier 151 corresponds to a ratio defined by the respective capacitive values of AC coupling capacitor 145 to capacitor 153. Reset switch 155 is activated (i.e., transitioned from an open state to a closed state) when a reset signal is received from controller 170. By activating reset switch 155, an operating point of amplifier 151 is reset to a reference voltage associated with a threshold value of comparator 160.

Comparator 160 is configured to provide pixel-level processing of pixel data received from sample node B. To that end, comparator 160 outputs an electrical response (e.g., a voltage) when the pixel data received from sample node B indicates that photodiode 112 detected a change in an intensity of incident illumination that breaches a threshold value. Alternatively, comparator 160 refrains from outputting an electrical response when the pixel data received from sample node B indicates that photodiode 112 did not detect a change in the intensity of incident illumination that breaches the threshold value. In some instances, an electrical response output by comparator 160 is referred to as event data.

In one implementation, comparator 160 is implemented using a plurality of comparators comprising a first comparator that is configured to output an electrical response indicative of positive events (e.g., events having a positive polarity) and a second comparator that is configured to output an electrical response indicative of negative events (e.g., events having a negative polarity). In one implementation, the first comparator outputs an electrical response when the pixel data received from sample node B indicates that photodiode 112 detected a change in the intensity of incident illumination that breaches a positive threshold value. In one implementation, the second comparator outputs an electrical response when the pixel data received from sample node B indicates that photodiode 112 detected a change in the intensity of incident illumination that breaches a negative threshold value.

Controller 170 is configured to coordinate with other components of the event sensor 100 (e.g., controllers within other pixels) to communicate an event signal (e.g., a sample of event data) to an event compiler 190 for each electrical response output by comparator 160. In one implementation, reset switch 155 receives a reset signal from controller 170 each time comparator 160 obtains pixel data at sampling node B that breaches the threshold value.

Event compiler 190 receives events signals (e.g., samples of event data) from each of the plurality of pixels 105 that each represent a change in an intensity of incident illumination breaching the threshold value. In response to receiving a sample of event data from a particular pixel of the plurality of pixels 105, event compiler 190 generates a pixel event. Pixel events generated by event compiler 190 when an event signal is associated with pixel data indicative of a change in the intensity of incident illumination that breaches a positive threshold value (or voltage) may be referred to as "positive" pixel events. In one implementation, positive pixel events are pixel events with a positive polarity that represent net increases in the intensity of incident illumination that exceed a magnitude defined by the upper threshold value or voltage ("$V_{th}$"). The pixel event generated by event compiler when an event signal is associated with pixel data indicative of a change in the intensity of incident illumination that breaches a negative threshold value (or voltage) may be referred to as a "negative" pixel event. In one implementation, negative pixel events are pixel events with a negative polarity that represent net decreases in the intensity of incident illumination that exceed a magnitude defined by the lower threshold value or voltage ("$-V_{th}$").

Furthermore, event compiler 190 populates the pixel event with information indicative of an electrical response (e.g., a value or a polarity of the electrical response) included in the event signal. In one implementation, event compiler 190 also populates the pixel event with one or more of: timestamp information corresponding to a point in time at which the pixel event was generated and an address identifier corresponding to the particular pixel that sent the event signal which triggered the pixel event. A stream of pixel events including each pixel event generated by event compiler 190 may then be communicated to an image pipeline (e.g. image or video processing circuitry) (not shown) associated with event sensor 100 for further processing.

By way of example, the stream of pixel events generated by event compiler 190 can be accumulated or otherwise combined to produce image data. In some implementations the stream of pixel events is combined to provide an intensity reconstruction image. In this implementation, an intensity reconstruction image generator (not shown) may accumulate pixel events over time to reconstruct/estimate absolute intensity values. As additional pixel events are accumulated the intensity reconstruction image generator changes the corresponding values in the reconstruction image. In this way, it generates and maintains an updated image of values for all pixels of an image even though only some of the pixels may have received events recently.

In various implementations, event driven sensors are implemented with a hardware architecture configured to support active, standby, and operational states. Generally, this involves an event sensor 210 outputting pixel events to an image pipeline 220 and, in response, receiving feedback information from image pipeline 220, as seen in the example system 200 of FIG. 2. Image pipeline 220 is configured to consume image data derived from the pixel events output by event sensor 210. To that end, image pipeline 220 includes one or more components, such as the intensity reconstruction image generator discussed above with respect to FIG. 1, to derive image data from the pixel events. The one or more components of image pipeline 220 may be implemented using various combinations of hardware components (e.g., application-specific integrated circuits, digital signal processors, and the like) and software components (e.g., noise reduction processes, image scaling processes, color space conversion processes, and the like).

In various implementations, image pipeline 220 effectuates some functionalities that utilize less than a full set of image data derived from the pixel events output by event sensor 210. By way of example, image pipeline 220 may further include a feature tracker configured to detect a feature depicted in the image data derived from the pixel events (e.g., using such techniques as SIFT, KAZE, and the like) and track that feature over time (e.g., using such techniques as a Kanade-Lucas-Tomasi tracker, a Shi-Tomasi tracker, and the like). In this example, the feature tracker of image pipeline 220 may effectuate an eye tracking functionality by detecting and tracking gaze characteristics (e.g., pupil center, pupil contour, glint locations, gaze direction, and the like) using image data depicting an eye of a user that is derived from pixel events output by event sensor 210.

Figure 3:
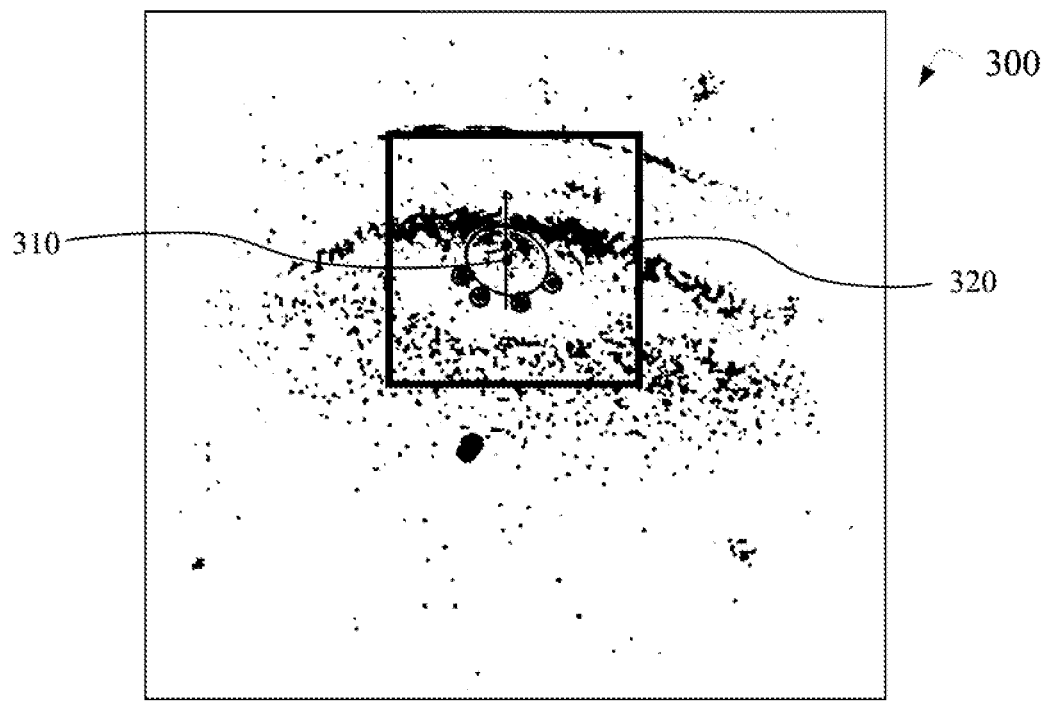
FIG. 3 illustrates an example of a full set of image data that an image pipeline derives from pixel events output by an event sensor.
Figure 4:
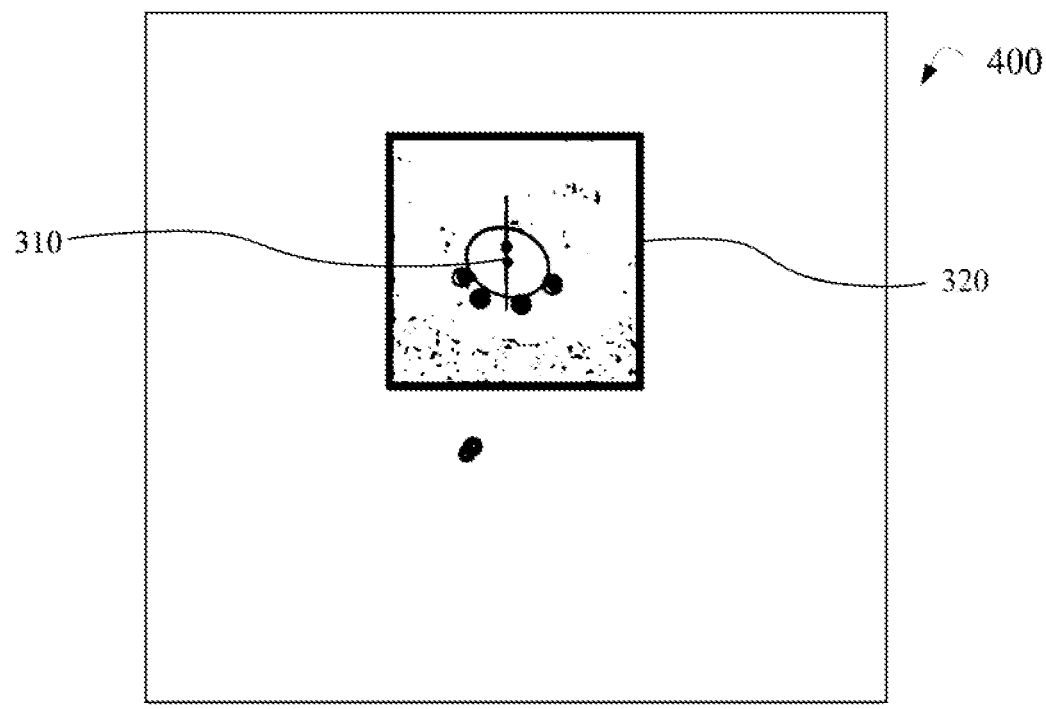
FIG. 4 illustrates an example of a cropped image data that an image pipeline derives from pixel events output by an event sensor.

FIG. 3 illustrates an example of a full set of image data 300 depicting an eye of a user that image pipeline 220 may derive from pixel events output by event sensor 210. To effectuate the eye tracking functionality, the feature tracker of image pipeline 220 has estimated a position of a pupil center ("estimated pupil center") 310 within the eye using a subset of image data 300 residing in a region of interest 320. Processing the full set of image data 300 to effectuate the eye tracking functionality may be computationally intensive for the feature tracker of image pipeline 220 and consume excessive power and computing resources. To improve computational efficiency and reduce power consumption, the feature tracker of image pipeline 220 may process the subset of image data residing in the region of interest 320. Image data residing outside of the region of interest 320 may be cropped to form cropped image data 400, as illustrated in FIG. 4.

One technique of cropping the image data residing outside of the region of interest 320 may be implemented using image pipeline 220. In accordance with this technique, image pipeline 220 may receive pixel events corresponding to a field of view of event sensor 210. To form the cropped image data 400, image pipeline 220 may either disregard pixel events corresponding to the image data residing outside of the region of interest 320 or crop the image data residing outside of the region of interest 320 after deriving the full set of image data 300. However, in either instance, event sensor 210 includes a subset of pixels generating the pixel events corresponding to the image data residing outside of the region of interest 320 that continue to consume power. Moreover, the pixel events corresponding to the image data residing outside of the region of interest 320 continue to consume bandwidth of a communication path between event sensor 210 and image pipeline 220. Accordingly, implementing a technique of cropping the image data residing outside of the region of interest 320 that involves event sensor 210 may further reduce power and bandwidth consumption.

Figure 2:
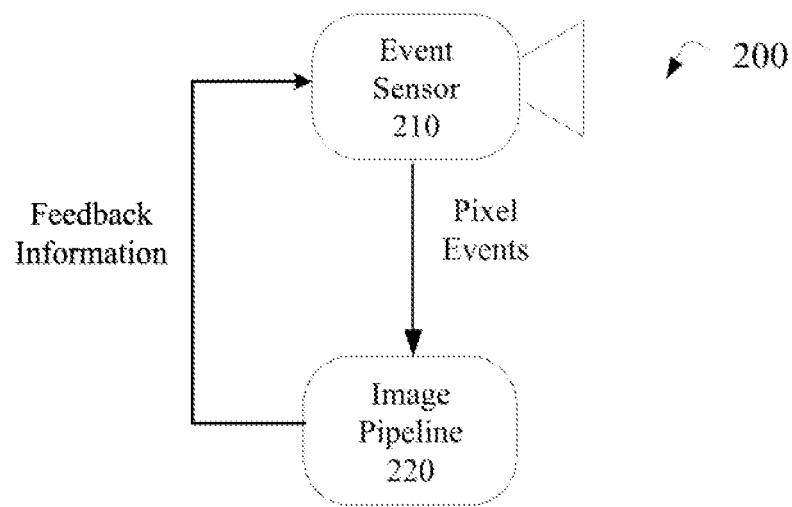
FIG. 2 is a block diagram of an example system for implementing event driven sensors with a hardware architecture configured to support active, standby, and inactive operational states.

To that end, image pipeline 220 communicates feedback information to event sensor 210, as illustrated in FIG. 2. In various implementations, such feedback information represents a feedback loop between an event sensor (e.g., event sensor 210) and an image pipeline (e.g., image pipeline 220). As discussed in greater detail below, an image pipeline consumes image data derived from pixel events output by the event sensor. Based on the image data, the image pipeline generates feedback information corresponding to a subset of the image data (e.g., a region of interest) that may be more useful to a particular image processing operation than other portions of the image data. That is, the feedback information corresponds to a subset of the image data one which processing is performed for a particular image processing operation. Responsive to the feedback information, an operational state of each pixel within a pixel array of the event sensor may be modified accordingly. In particular, different pixels within a pixel array of the event sensor may have different operational states based on the feedback information received from the image pipeline.

Figure 5:
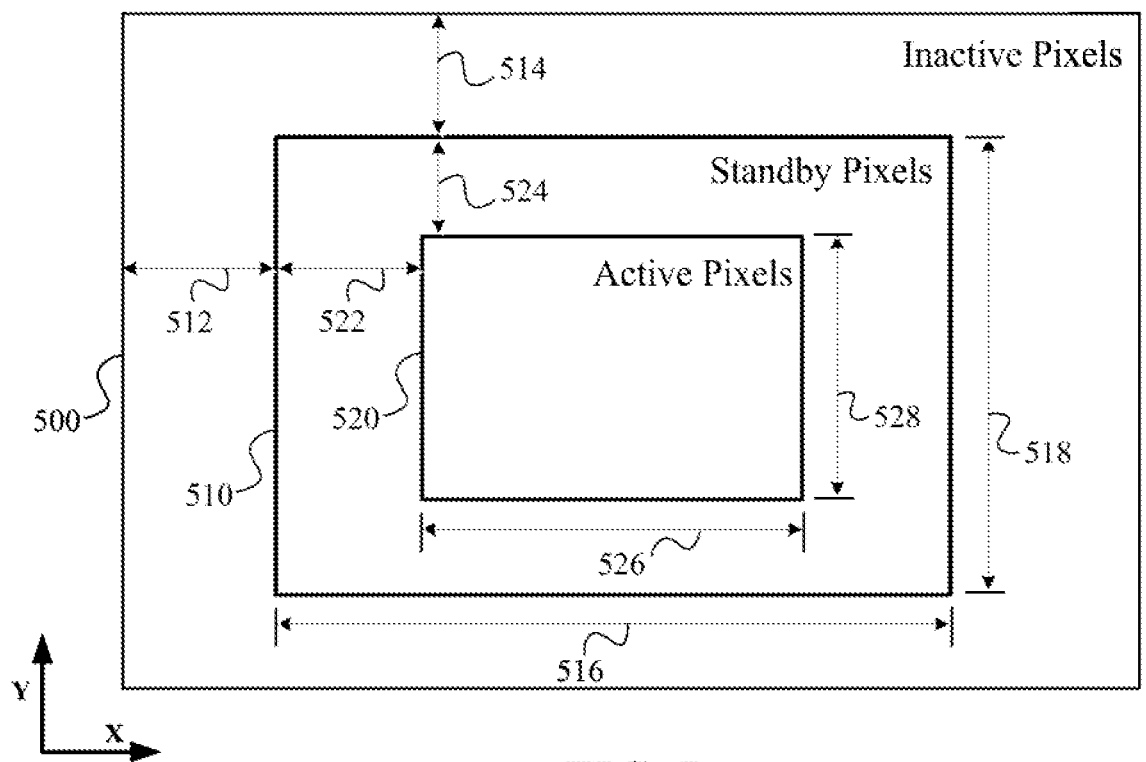
FIG. 5 illustrates an example of different pixels within a pixel array of an event sensor having different operational states based on feedback information received from an image pipeline.

FIG. 5 illustrates an example of a pixel array 500 of an event sensor with pixels configured to support different operational states. Pixel array 500 includes a plurality of pixels positioned to receive light from a scene disposed within a field of view of the event sensor. As such, when an operational state of each pixel among the plurality of pixels is an active state, image data derived from pixel events output by the event sensor generally depict a field of view of the event sensor. As used herein, "active state" refers to an operational state of a pixel in which a photodetector circuit and an event circuit of the pixel are each activated (or fully-functional). In one implementation, a pixel having an event circuit and a photodetector circuit that are each activated (or fully-functional) is defined as operating in a full power mode.

When the event sensor receives feedback information from an image pipeline that less than a full set of image data is being processed by a particular image processing operation, some pixels of the event sensor may transition from the active state to another operational state. For example, some pixels of the event sensor may transition to an inactive state. As used herein, "inactive state" refers to an operational state of a pixel in which the pixel is less than fully-functional. In one implementation, a photodetector circuit and an event circuit of a pixel in an inactive state are each deactivated (or non-functional). In one implementation, a pixel having an event circuit and a photodetector circuit that are each deactivated (or non-functional) is defined as operating in a shutdown power mode.

In some instances, a pixel of an event sensor may be unable to instantly transition from an inactive state to an active state. To mitigate such latency issues, some pixels of the event sensor may transition from the active state to a standby state. As used herein, "standby state" refers to an operational state of a pixel in which the pixel is less than fully-functional but is more functional than pixels in an inactive state. In one implementation, an event circuit of a pixel is deactivated (or non-functional) when the pixel transitions to a standby state while a photodetector circuit of the pixel is activated (or fully-functional). In one implementation, a pixel having a deactivated (or non-functional) event circuit and an activated (or fully-functional) photodetector circuit is defined as operating in a reduced power mode.

By way of example, an image pipeline may communicate feedback information based on image data 300 of FIG. 3. In response to that feedback information, a first subset of pixels within region 520 of pixel array 500 are in an active state, a second subset of pixels within region 510 are in a standby state, and a third subset of pixels external to regions 510 and 520 are in an inactive state. In this example, the first subset of pixels within region 520 may be associated with the pixel events corresponding to the region of interest 320 of FIGS. 3 and 4. In one implementation, region 520 defines an active region of pixel array 500. In one implementation, a subset of pixels within the active region (e.g., region 520) operate in a shutdown power mode or a reduced power mode.

In one implementation, the feedback information includes parameters that define a location of one or more regions within pixel array 500. For example, the parameters that define a location of region 510 may include offset values specified relative to boundaries of pixel array 500, such as x-offset 512, y-offset 514, or a combination thereof. As another example, the parameters that define a location of region 520 may include offset values specified relative to boundaries of pixel array 500, such as some combination of x-offset 512, x-offset 522, y-offset 514, and y-offset 524.

In one implementation, one or more regions of pixel array 500 have a predefined size. For example, region 510 may have a predefined size specified as width 516 and height 518. As another example, region 520 may have a predefined size specified as width 526 and height 528. In one implementation, the feedback information includes parameters that define a size of one or more regions within pixel array 500. For example, the parameters of the feedback information may define one or more of width 516, width 526, height 518, and height 528.

Figure 6:
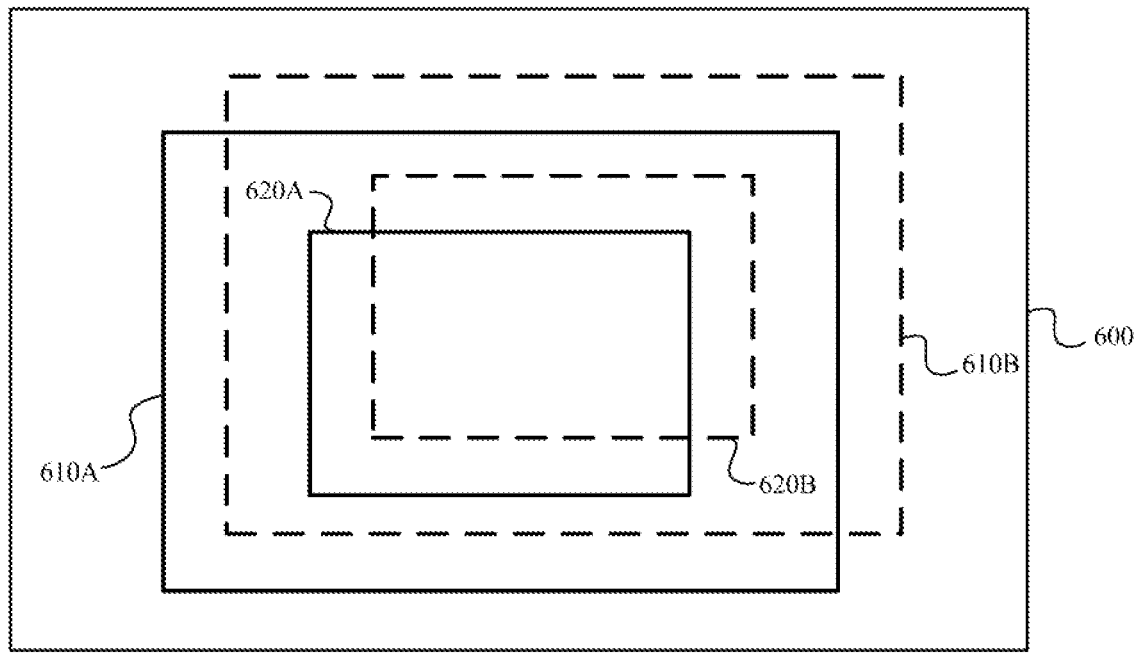
FIG. 6 illustrates an example of a pixel array with different pixels having different operational states modifying the operational states of some pixels as feedback information received from an image pipeline updates between a first time and a second time.

FIG. 6 illustrates an example of a pixel array 600 an event sensor with different pixels having different operational states modifying the operational states of some pixels as feedback information received from an image pipeline updates between a first time and a second time. At the first time, an image pipeline may generate feedback information based on image data derived from pixel events output by the event sensor. In response to receiving the feedback information generated by the image pipeline at the first time, a first subset of pixels within region 620A of pixel array 600 are in an active state, a second subset of pixels within region 610A are in a standby state, and a third subset of pixels external to regions 610A and 620A are in an inactive state.

Subsequent to the first time, the image pipeline may receive additional pixel events from the event sensor that changes the image data being processed by the image pipeline. For example, a location of a feature of interest (e.g., pupil center 310 of FIG. 3) within the image data may change as the image data is updated by the additional pixel events. At a second time, the image pipeline may generate feedback information that accounts for that change in the image data arising from the additional pixel events. In response to receiving the feedback information generated by the image pipeline at the second time, a first subset of pixels within region 620B of pixel array 600 are in an active state, a second subset of pixels within region 610B are in a standby state, and a third subset of pixels external to regions 610B and 620B are in an inactive state.

Figure 7:
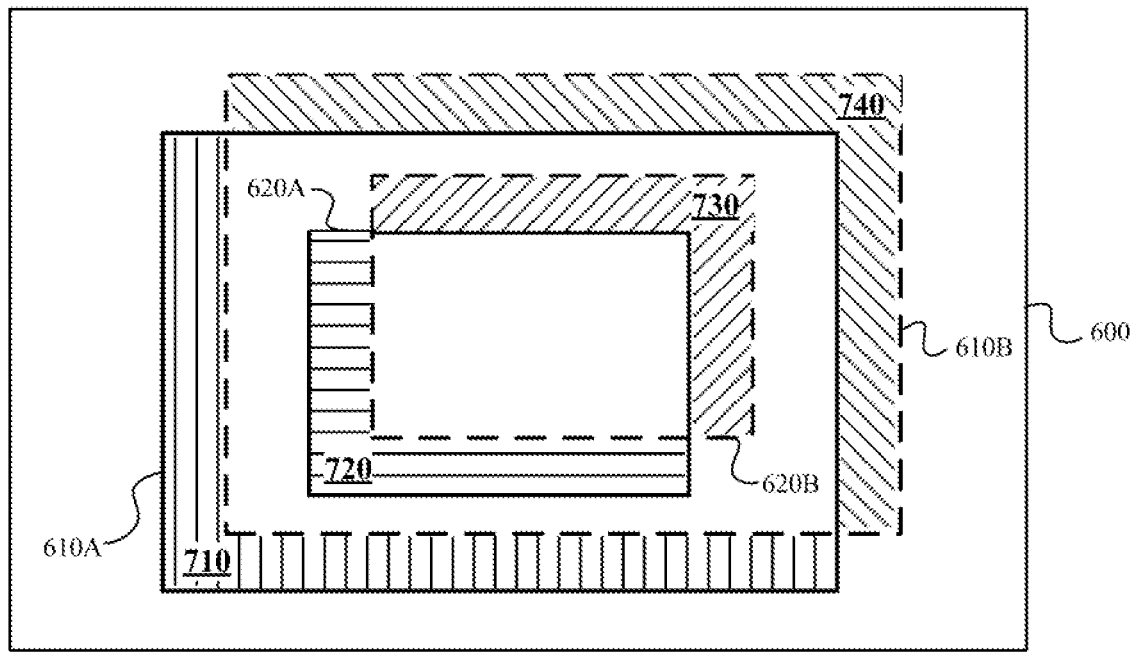
FIG. 7 illustrates subsets of pixels within the pixel array of FIG. 6 that transition from one operational state to another operational state as the feedback information received from the image pipeline updates between the first time and the second time.

Between the first time and the second time some pixels within pixel array 600 transition from one operational state to another operational state in response to the feedback information received from the image pipeline. For example, as seen in FIG. 7, pixels within sub-region 710 that were in the standby state at the first time would transition to the inactive state at the second time. Pixels within sub-region 720 of pixel array 600 that were in the active state at the first time would transition to the standby state at the second time. Similarly, pixels within sub-region 730 that were in the standby state at the first time would transition to the active state at the second time and pixels within sub-region 740 that were in the inactive state at the first time would transition to the standby state at the second time.

In various implementations, an event sensor (e.g., event sensor 210 of FIG. 2) may be configured to output pixel events to an image pipeline (e.g., image pipeline 220). As discussed above with respect to FIG. 1, in various implementations, an event compiler of the event sensor (e.g., event compiler 190) may populate each pixel event with some combination of: (i) an address identifier corresponding to a particular pixel that sent an event signal which triggered a respective pixel event (e.g., x/y-coordinates of the particular pixel—[x,y]); (ii) information indicative of an electrical response (e.g., a value or a polarity of the electrical response—"Intensity") included in the event signal; and (iii) timestamp information corresponding to a point in time ("T") at which the respective pixel event was generated. If event compilers of the event sensor generate a number ("N") of pixel events and populated each pixel event with all three data points, those N—pixel events (pixel events 1 . . . N) could be represented as the following list of pixel events: ([x,y], Intensity-$_1$, T$_1$), ([x,y], Intensity-$_2$, T$_2$), . . . , ([x,y], Intensity-$_N$, T$_N$). In one implementation, an event sensor is configured to output such pixel events as bins of pixel events to the image pipeline (e.g., image pipeline 220). Generally, a bin of pixel events is considered a collection of pixel events. One skilled in the art will recognize that binning involves grouping individual data values (e.g., pixel events) into defined intervals (or bins).

In one implementation, such intervals may be defined based on an event count. For example, the event sensor may output each bin of pixel events after a predefined number of pixel events (e.g., 10 pixel events) are generated. In this implementation, continuing with the preceding example and assuming N=40, the 40 pixel events generated by the event compilers may be grouped into 4 bins of pixel events for output to the image pipeline. The four bins of this example would include: a first bin of pixel events comprising pixel events 1 . . . 10; a second bin of pixel events comprising pixel events 11 . . . 20; a third bin of pixel events comprising pixel events 21 . . . 30; and a fourth bin of pixel events comprising pixel events 31 . . . 40. In one implementation, a hardware/software-based event counter of the event sensor may monitor a number of pixel events being generated by one or more event compilers and cause the event sensor to output a bin of pixel events when that number reaches the predefined number of pixel events.

In one implementation, such intervals may be defined using a periodic basis (e.g., every 0.5 millisecond ("ms")). In this implementation, continuing with the preceding example and assuming regularly spaced timestamps among the 40 pixel events over a 4 ms time period, the 40 pixel events may be grouped into 8 bins of pixel events. The eight bins of this example would include: a first bin of pixel events comprising pixel events generated between 0-0.5 ms of the 4 ms time period (pixel events 1 . . . 5); a second bin of pixel events comprising pixel events generated between 0.5-1.0 ms (pixel events 6 . . . 10); a third bin of pixel events comprising pixel events generated between 1.0-1.5 ms (pixel events 11 . . . 15); a fourth bin of pixel events comprising pixel events generated between 1.5-2.0 ms (pixel events 16 . . . 20); a fifth bin of pixel events comprising pixel events generated between 2.0-2.5 ms (pixel events 21 . . . 25); a sixth bin of pixel events comprising pixel events generated between 2.5-3.0 ms (pixel events 26 . . . 30); a seventh bin of pixel events comprising pixel events generated between 3.0-3.5 ms (pixel events 31 . . . 35); and an eighth bin of pixel events comprising pixel events generated between 3.5-4.0 ms (pixel events 36 . . . 40).

In one implementation, the periodic basis is synchronized with a global readout operation or a global reset operation of the event sensor. In one implementation, a global readout operation involves a respective controller of each pixel within a particular subset of pixels (e.g., a particular row or a particular column) triggering a respective comparator to process pixel data at a common (or substantially common) time. In one implementation, a global reset operation involves a value (or voltage) of pixel data being reset to a reference value (or voltage) $V_{ref}$ each time a sample of pixel data is processed by a respective comparator.

Figure 8:
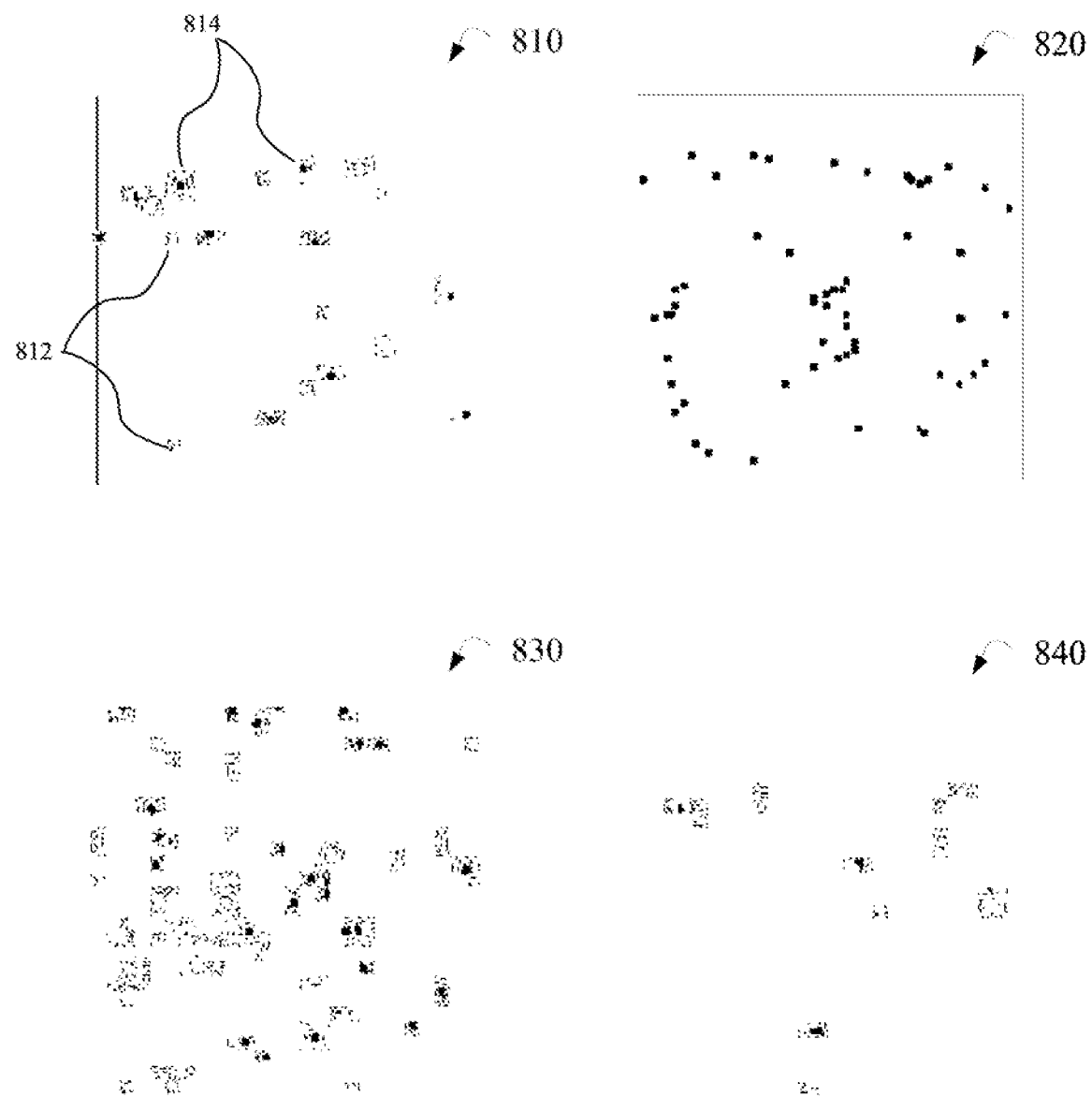
FIG. 8 illustrates example two-dimensional ("2-D") tiles of pixel events that an event sensor output for further processing, in accordance with some implementations.

In one implementation, each bin of pixel events is output as a list of pixel events (e.g., similar to the list of pixel events presented above). In one implementation, each bin of pixel events is output as a two-dimensional ("2-D") tile of pixel events. FIG. 8 depicts examples of such 2-D tiles of pixel events that an event sensor may generate for output to an image pipeline. In one implementation, each pixel event is mapped to a particular location of a corresponding 2-D tile of pixel events using address identifier information. In one implementation, each 2-D tile encodes a value or a polarity of an electrical response provided by each pixel event included in a corresponding bin of pixel events. Upon receiving a particular 2-D tile (e.g., tile 810), an image pipeline may identify particular pixels that both detected positive changes in incident illumination within a given interval (e.g., pixel events 812) and negative changes in incident illumination within the given interval (e.g., pixel events 814). In one implementation, the image pipeline may update an intensity reconstruction image using the values or the polarity of an electrical response encoded in a 2-D tile.

Figure 9:
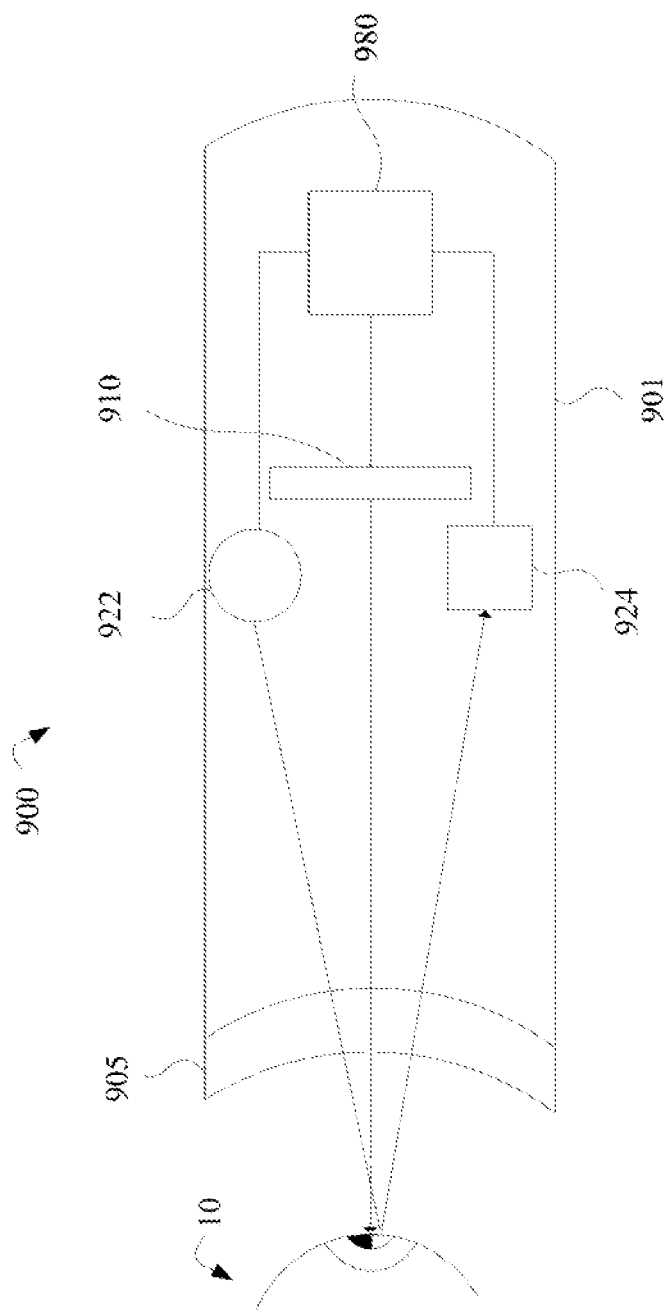
FIG. 9 is a block diagram of an example head-mounted device (HMD) in accordance with some implementations.

FIG. 9 illustrates a block diagram of a head-mounted device 900 in accordance with some implementations. Head-mounted device 900 includes a housing 901 (or enclosure) that houses various components of head-mounted device 900. Housing 901 includes (or is coupled to) an eye pad 905 disposed at a proximal end of housing 901 with respect to a user 10 of head-mounted device 900. In various implementations, eye pad 905 is a plastic or rubber piece that comfortably and snugly keeps head-mounted device 900 in the proper position on the face of the user 10 (e.g., surrounding the eye of the user 10).

In some implementations, image data is presented to the user 10 of head-mounted device 900 via a display 910 disposed within housing 901. Although FIG. 9 illustrates a head-mounted device 900 including a display 910 and an eye pad 905, in various implementations, the head-mounted device 900 does not include a display 910 or includes an optical see-through display without including an eye pad 905.

Head-mounted device 900 further includes a gaze tracking system disposed within housing 901 comprising an event sensor 924, a controller 980, and optionally one or more optical sources 922. In general, controller 980 is configured to interact with event sensor 924 and a feature tracker of an image pipeline (e.g., image pipeline 220 of FIG. 2) to detect and track gaze characteristics of the user 10. In one implementation, the system includes one or more optical sources 922, which emit a light that reflects off the eye of the user 10 as a light pattern (e.g., a circle of glints) that is detected by event sensor 924. To that end, controller 980 is configured to activate the one or more optical sources 922 in response to information (e.g., feedback information) received from the image pipeline. Based on the light pattern, the feature tracker of the image pipeline can determine a gaze tracking characteristic (e.g., gaze direction, pupil center, pupil size, and the like) of the user 10.

In one implementation, controller 980 is configured to activate optical source 922 by pulsing optical source 922 at a defined frequency (e.g., 300 Hertz). In one implementation, pulsing optical source 922 at the defined frequency causes at least a subset of pixels (e.g., pixels in an active state) within event sensor 924 to generate event data at a rate that is proportional to the defined frequency.

In one implementation, no optical sources are used, and the eye is being passively illuminated by the light present in the environment. A gaze tracking characteristic (e.g., gaze direction, pupil center, pupil size, and the like) can be determined by analyzing the image and extracting features (for example using template matching, or combining a corner or feature detector with a classifier, or using a trained neural network) such as a pupil location, appearance and shape, and relate this to the position and appearance of additional features of the eye such as the iris contour (limbus), or eyelid shape and eyelid corner location.

FIG. 10 is a flow-chart illustrating an example of a method 1000 of implementing an event camera system architecture with a feedback loop and an event driven sensor configured to support multiple power states. In one implementation, method 1000 is effectuated by event sensor 210 of FIG. 2. At block 1002, method 1000 includes outputting pixel events from an event sensor with a pixel array to an image pipeline. The pixel array configured to have an active region of pixels operating in a full power mode and an inactive region of pixels operating in a shutdown power mode or a reduced power mode. Each respective pixel event is generated in response to a specific pixel within the active region of pixels detecting a change in light intensity that exceeds a comparator threshold.

In one implementation, the pixel events are output from the event sensor as a bin of pixel events. In one implementation, the event sensor is configured to output bins of pixel events on a periodic basis. In one implementation, the periodic basis is synchronized with a global readout operation or a global reset operation of the event sensor. In one implementation, the bin of pixel events is output from the event sensor after a predefined number of pixel events are generated. In one implementation, the bin of pixel events is output as a 2-D tile of pixel events (e.g., the 2-D tiles of pixel events depicted in FIG. 8). In one implementation, the pixel events are output from the event sensor as a list of pixel events.

At block 1004, method 1000 includes receiving feedback information from the image pipeline based on image data derived from the pixel events. In one implementation, the feedback information is an active region offset that defines a region of the pixel array corresponding to a region of interest that the image pipeline tracks within the image data. At block 1006, method 1000 includes directing a pixel within the active region of pixels to operate in the shutdown power mode or the reduced power mode in response to receiving the feedback information.

In one implementation, the feedback information may include a bitmask, said bitmask encoding the target pixel state for each individual pixel, for example said bitmask could represent a circular region being in active state while the rest of the sensor is in a ready or an inactive state; furthermore it can be easily seen how said mask can represent any arbitrarily shaped region or set of regions in the sensor being set in one of the mentioned states, with the smallest said region being any individual pixel.

FIG. 11 is a flow-chart illustrating another example of a method 1100 of implementing an event camera system architecture with a feedback loop and an event driven sensor configured to support multiple power states. In one implementation, method 1000 is effectuated by image pipeline 220 of FIG. 2. At block 1102, method 1100 includes receiving, by an image pipeline, pixel events from an event sensor with a pixel array including a first subset of pixels in an active state and a second subset of pixels in an inactive state. Each respective pixel event is generated in response to a specific pixel within the first subset of pixels detecting a change in light intensity that exceeds a comparator threshold. In one implementation, the pixel events are received from the event sensor as a bin of pixel events. In one implementation, the pixel events are received from the event sensor as a list of pixel events.

At block 1104, method 1100 includes deriving image data from the pixel events with the image pipeline. At block 1106, method 1100 includes generating feedback information with the image pipeline based on the image data. The feedback information causes the event sensor to direct a pixel within the first subset of pixels to transition from the active state to another operational state. In one implementation, the feedback information causes the event sensor to direct the pixel within the first subset of pixels to transition from the active state to an inactive state. In one implementation, the feedback information causes the event sensor to direct the pixel within the first subset of pixels to transition from the active state to a standby state. In one implementation, generating the feedback information comprises tracking a region of interest within the image data with the image pipeline. In one implementation, the feedback information is an active region offset that defines a region of the pixel array corresponding to a region of interest that the image pipeline tracks within the image data.

In one implementation, method 1100 further includes pulsing an optical source configured to emit light towards a scene disposed within a field of view of the event sensor at a defined frequency. In one implementation, pulsing the optical source at the defined frequency causes pixels within the first subset of pixels to generate event data at a rate that is proportional to the defined frequency.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A system comprising:
   an event sensor with a pixel array configured to operate a first subset of pixels in an active state and a second subset of pixels in an inactive state, the event sensor configured to output pixel events, each respective pixel event generated in response to a specific pixel within the first subset of pixels detecting a change in light intensity that exceeds a comparator threshold; and
   an image pipeline configured to consume image data derived from the pixel events and communicate feedback information to the event sensor based on the image data, the feedback information causing a pixel within the first subset of pixels to transition from the active state to another state.

2. The system of claim 1, wherein the feedback information corresponds to a region of interest that is tracked by the image pipeline within the image data.

3. The system of any of claim 1, wherein each pixel in the second subset of pixels operates in a shutdown power mode.

4. The system of any of claim 1, wherein the pixel array further includes a third subset of pixels in a standby state, each pixel in the third subset of pixels operating in a reduced power mode.

5. The system of claim 4, wherein the feedback information causes the pixel within the first subset of pixels to transition to the standby state.

6. A system comprising:
   an event sensor with a pixel array configured to have an active region of pixels operating in a full power mode and an inactive region of pixels operating in a shutdown power mode or a reduced power mode;
   a processor; and
   a computer-readable storage medium comprising instructions that upon execution by the processor cause the system to perform operations, the operations comprising:
   outputting pixel events from the event sensor to an image pipeline, each respective pixel event generated in response to a specific pixel within the active region of pixels detecting a change in light intensity that exceeds a comparator threshold;
   receiving feedback information from the image pipeline based on image data derived from the pixel events; and
   directing a pixel within the active region of pixels to operate in the shutdown power mode or the reduced power mode in response to receiving the feedback information.

7. The system of claim 6, wherein each pixel within the inactive region of pixels operates in the shutdown power mode, and wherein the pixel array further includes a standby region of pixels operating in the reduced power mode.

8. The system of claim 7, wherein the standby region of pixels intervenes between the active region of pixels and the inactive region of pixels within the pixel array.

9. The system of any of claim 6, wherein a subset of pixels within the active region of pixels operate in the shutdown power mode or the reduced power mode.

10. The system of any of claim 6, wherein outputting the pixel events comprises: outputting bins of pixel events from the event sensor to the image pipeline.

11. The system of claim 10, wherein the bins of pixel events are output from the event sensor on a periodic basis.

12. The system of claim 11, wherein the periodic basis is synchronized with a global readout operation or a global reset operation of the event sensor.

13. The system of claim 10, wherein the event sensor outputs each bin of pixel events after a predefined number of pixel events are generated.

14. The system of claim 10, wherein each bin of pixel events is output as a two-dimensional tile of pixel events.

15. The system of claim 10, wherein each bin of pixel events is output from the event sensor as a list of pixel events.

16. A system comprising:
   a processor;
   an image pipeline; and
   a computer-readable storage medium comprising instructions that upon execution by the processor cause the system to perform operations, the operations comprising:
   receiving, by the image pipeline, pixel events from an event sensor with a pixel array including a first subset of pixels in an active state and a second subset of pixels in an inactive state, each respective pixel event generated in response to a specific pixel within the first subset of pixels detecting a change in light intensity that exceeds a comparator threshold;
   deriving image data from the pixel events with the image pipeline; and
   generating feedback information with the image pipeline based on the image data, the feedback information causing the event sensor to direct a pixel within the first subset of pixels to transition from the active state to another state.

17. The system of claim 16, wherein generating the feedback information comprises:
   tracking a region of interest within the image data with the image pipeline.

18. The system of any of claim 16, further comprising:
   an optical source configured to emit light towards a scene disposed within a field of view of the event sensor.

19. The system of claim 18, wherein the instructions, when executed, further cause the system to perform additional operations, the additional operations comprising:
   pulsing the optical source at a defined frequency to cause pixels within the first subset of pixels to generate event data at a rate that is proportional to the defined frequency.

20. The system of any of claim 16, wherein the feedback information is an active region offset that defines a region of the pixel array corresponding to a region of interest that the image pipeline tracks within the image data.

* * * * *